(12) United States Patent
Linderö

(10) Patent No.: US 7,400,244 B2
(45) Date of Patent: Jul. 15, 2008

(54) SYSTEM AND METHOD FOR DETERMINING THE LOCATION OF A MOVING OBJECT IN A SECLUDED SPACE

(75) Inventor: Björn Linderö, Sigtuna (SE)

(73) Assignee: SAAB AB, Linkoping (SE)

( * ) Notice: Subject to any disclaimer, the term of this patent is extended or adjusted under 35 U.S.C. 154(b) by 337 days.

(21) Appl. No.: 10/846,505

(22) Filed: May 17, 2004

(65) Prior Publication Data

US 2005/0200477 A1 Sep. 15, 2005

(30) Foreign Application Priority Data

Mar. 9, 2004 (EP) ................................ 04075768

(51) Int. Cl.
*G08B 1/08* (2006.01)
(52) U.S. Cl. ............... 340/539.13; 340/539.1; 340/539.16; 340/539.22; 340/825.49; 340/825.69
(58) Field of Classification Search ........... 340/539.13, 340/539.1, 539.11, 539.14, 539.16, 539.22, 340/539.23, 572.1, 572.4, 825.49, 825.69, 340/539.26
See application file for complete search history.

(56) References Cited

U.S. PATENT DOCUMENTS

| | | | |
|---|---|---|---|
| 4,951,263 A | 8/1990 | Shope | |
| 5,695,341 A * | 12/1997 | FitzGerald et al. | 434/16 |
| 5,748,148 A * | 5/1998 | Heiser et al. | 342/457 |
| 5,815,114 A * | 9/1998 | Speasl et al. | 342/357.06 |
| 5,876,310 A * | 3/1999 | Mackey et al. | 482/74 |
| 5,892,454 A * | 4/1999 | Schipper et al. | 340/825.37 |
| 5,917,425 A | 6/1999 | Crimmins et al. | |
| 6,239,721 B1 * | 5/2001 | Smith | 340/825.49 |
| 6,292,106 B1 * | 9/2001 | Solinsky et al. | 340/825.49 |
| 6,396,413 B2 * | 5/2002 | Hines et al. | 340/825.49 |
| 6,579,097 B1 | 6/2003 | Sampson et al. | |
| 6,970,097 B2 * | 11/2005 | Welles et al. | 340/825.49 |
| 2001/0036832 A1 * | 11/2001 | McKay | |
| 2004/0021569 A1 * | 2/2004 | Lepkofker et al. | |

FOREIGN PATENT DOCUMENTS

| | | |
|---|---|---|
| DE | 40 26 207 | 2/1992 |
| DE | 196 11 209 | 9/1997 |
| EP | 0 672 918 | 9/1995 |
| WO | WO 97/35208 | 9/1997 |

* cited by examiner

*Primary Examiner*—Hung Nguyen
(74) *Attorney, Agent, or Firm*—Venable LLP; Michael A. Sartori; Jeffri A. Kaminski

(57) ABSTRACT

A system for determining a location of a moving object in an enclosed space comprises at least one first transmitter adapted to be located in the enclosed space, wherein each of the first transmitters is operable to transmit a code associated with the first transmitter, wherein the code is representative of a coordinate in a predetermined coordinate system, a first receiver adapted to be located on a moving object, the receiver operable to receive the code, and a first processing unit adapted to be located on the moving object, the processing unit operable to process codes from the first receiver to determine the location of the moving object based on the code.

18 Claims, 2 Drawing Sheets

SYSTEM AND METHOD FOR DETERMINING THE LOCATION OF A MOVING OBJECT IN A SECLUDED SPACE

FIELD OF THE INVENTION

The present invention relates to a system for determining the location of a moving object in an enclosed space such as a building, and in particular relates to a system for use in combat training.

BACKGROUND OF THE INVENTION

Combat training systems existing today are generally built-up based on a central station communicating with a number of players such as soldiers, laser based weapon simulation systems, etc. The players are arranged to report to the central station registered events such as fire/trigger, detonation, hit, far miss, near miss and side effects together with time information and information about the location of the player.

It has become more and more important to train soldiers for battles not only in conventional training terrain but also in urban terrain. However, in urban terrain conventional position location systems such as GPS do not function properly, as the GPS-signals do not reach indoors and other enclosed spaces. Therefore, it has not been possible to directly apply the combat training systems to training in urban terrain without first solving the problem of position determination in enclosed spaces, such as in buildings.

U.S. Pat. No. 5,917,425 describes a system for determining the location and the identity of a device or person in an enclosure. The system comprises a plurality of stationary infrared transmitters distributed in various zones within the enclosure and a plurality of portable transceivers, each being associated with a dedicated person or device. Each of the transmitters includes means for generating an infrared location code signal representative of the location of the associated transmitter within the enclosure. Each of the portable transceivers is formed from an infrared receiver responsive to detect infrared location code signals from stationary infrared transmitters, means for generating a PIN signal representative of the person or device with which the portable transceiver is associated, and an RF transmitter to generate bursts of an RF output signal representative of the PIN code and the detected location code for detection by a remote RF receiver and use at a central station.

WO 97/35208 concerns a method and device for determining the position of moving objects, in particular moving participants in battle practice. Optoelectronic transmitters are disposed in sections/rooms/shelters in the battle practice field, the optoelectronic transmitters continuously transmitting data concerning at least the transmitter position. If a moving object enters the optoelectronic transmitter reception range, a receiver of the moving object receives the data concerning the transmitter position and the received data is transmitted via a radio data transmission system to a battle control centre. The method described enables the exact position of the moving objects and participants in the battle practice to be determined even when they are located in rooms or on sites which makes it impossible to determine positions using GPS signals.

U.S. Pat. No. 6,579,097 describes a method of training players in an urban environment. The method comprises the steps of equipping a plurality of players with optical detectors, SAT-equipped small arms weapons and player units; installing a locator in a combat area and causing the players to enter the combat area. The locator transmits infrared energy, the infrared energy having a location code located therein. The optical detectors of at least one of the players that has entered the combat area receives the infrared energy transmitted from the locator, and the location code in the received infrared energy is logged in the player unit of a player that has received the infrared energy.

Using the above mentioned solutions, it is possible to provide position determination also in enclosed spaces, such as in buildings. In a combat training system based on these position determination solutions for urban training, the central unit has means for relating every received location code to a specific space or a specific room in a specific building, for example graphically. However, it is not possible to apply the above mentioned positioning determination solutions in communication with units which are not provided with the above mentioned means. Especially, with the above mentioned position determination methods, the player units themselves do not know their positions.

SUMMARY OF THE INVENTION

One object of the invention is to provide a position location system for enclosed spaces, which is not burdened with the drawbacks of the prior art, and thus delivers position information which need not be decoded before use.

One embodiment of the present invention includes a system for determining the location of a moving object in an enclosed space, such as a building. The system comprises a) at least one first transmitter placed in the enclosed space, wherein each of the first transmitters is arranged to transmit a code associated to said transmitter; b) a first receiver arranged on each moving object, said receiver being arranged to receive said code, and c) a first processing unit arranged on each moving object, said processing unit being arranged to process codes from said first receiver in order to determine the location of the moving object from said code. The system is characterized in that the code is representative of a coordinate in a predetermined coordinate system. The predetermined coordinate system is a coordinate system used for positioning outdoors and in other non-enclosed spaces. Thereby, a seamless integration is provided between the positioning system used in enclosed spaces and the positioning system used outdoors. The predetermined coordinate system is in one embodiment a global positioning system, such as GPS. It can also be a local positioning system, for example using a plurality of transmitters, such as radio transmitters, geometrically distributed over a geographical field and having known positions.

The system for determining the location of a moving object in a building or another enclosed space can be used in military training in urban terrain, but also in other applications such as in police education or in rescue service. In a case where the system is used in military training, the moving objects are soldiers, weapons with associated shooting simulators, vehicles, etc. When the system is used in other applications, the moving objects are persons and movable equipment applicable in the specific application.

In one preferred embodiment of the invention each code denotes a specific zone of the enclosed space. Each moving object is then provided with means for storing a cross-reference table comprising each zone and its associated coordinate in said predetermined coordinate system and the processing means are arranged to convert the received code to the associated coordinate in the predetermined coordinate system using said cross-reference table. Alternatively, the code transmitted by each first transmitter denotes the coordinate given in the predetermined coordinate system for the zone.

In the preferred embodiment wherein the moving objects are provided with said means for storing a cross-reference table, at least one second transmitter can be arranged in or in the vicinity of the enclosed space, said second transmitter being arranged to transmit said cross-reference table data. The second transmitter is installed such that the transmission of table data reaches objects entering the enclosed space. Each moving object is then provided with a second receiver operatively connected to said storing means, said second received being arranged to receive the table data from said second transmitter, and the storing means are arranged to store the table data at least as long as the moving object is in the enclosed space. Alternatively, each moving object is provided with a pre-stored cross-reference table comprising each zone and its associated coordinate in said predetermined coordinate system.

The present invention also relates to a combat training system comprising a number of players, wherein each player is arranged to determine its location. The combat training system is characterized in that the above described system for determining the location of a moving object is arranged to determine the location information for the player when the player is within an enclosed space.

In one embodiment of the combat training system according each player is arranged to transmit the location information to a central unit and/or to the other players. Further, the processing means can be arranged to associate time data to the determined location information, whereupon the location information is transmitted with the associated time information.

The invention further involves a method for determining the location of a moving object in an enclosed space, such as a building. The method comprises transmitting a code into a zone of the enclosed space, said code being associated to said zone; receiving at each moving object present within a zone of said enclosed space the associated code; and processing at each moving object the received code in order to determine the location of the moving object. The method is characterized in that the code is representative of a coordinate in a predetermined coordinate system The systems and method according to the invention has a number of advantages compared to prior art techniques. As the position information for the moving objects is obtained in a coordinate system used outside the enclosed spaces, the position information obtained from moving objects in the enclosed spaces do not require special treatment. This advantage is especially appreciable in a distributed system, wherein the moving objects transmit position information to each other, as each moving object does not need to be able to handle position information requiring special treatment. In fact, objects receiving the position information (such as a central unit, moving objects other than the object generating the position information, or the object generating the position information and logging its movements in a log memory) are not able to determine whether the moving object generating the position information is within an enclosed area or a non-enclosed area from the format of the position information, i.e. the systems/method according to the invention provides seamless integration between the positioning system for enclosed spaces and the positioning system used outdoors.

DETAILED DESCRIPTION OF THE PREFERRED EMBODIMENTS

Figure 1:
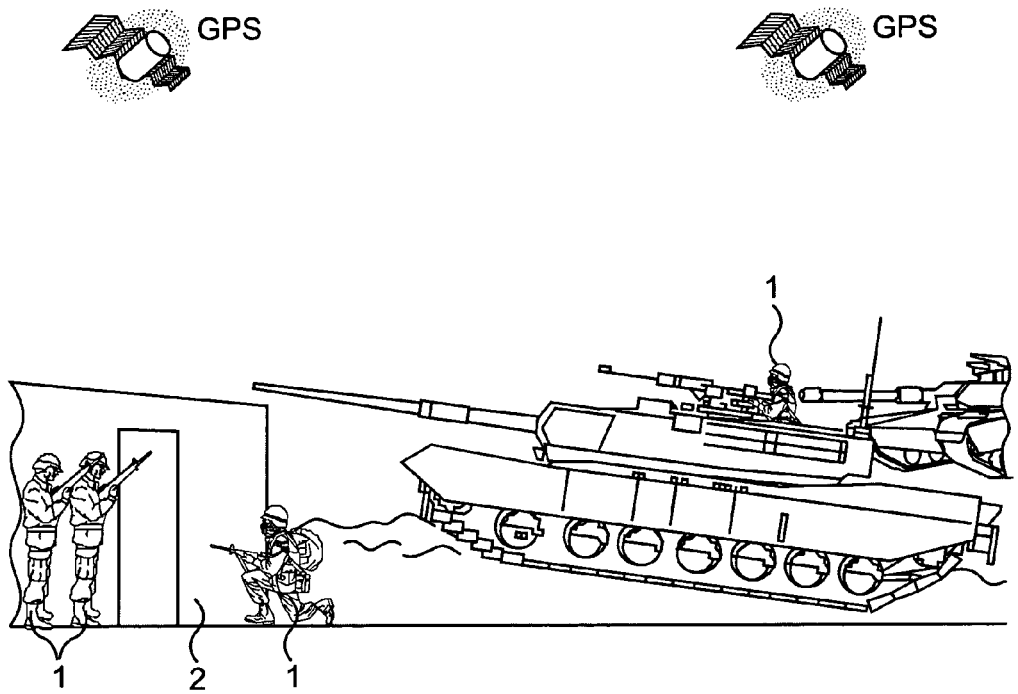
FIG. 1 shows an example of a part of a training field.

As shown in FIG. 1, a number of players 1 participate in combat training in a training field. The training field includes conventional combat training terrain as well as urban terrain with a building 2 or otherwise enclosed space, for example, in the form of a roof structure. The enclosed space can also be, for example, a bunker or a ship.

The players in the example shown in FIG. 1 are soldiers, a vehicle and a weapon simulation system, which is mounted on a real weapon. The players need to be continuously updated with position information in order to simulate events and for position reports to game control. The players are arranged to simulate events such as fire/trigger, detonation, hit, far miss, near miss, side effects, etc. However, methods for simulating events are not the subject-matter of this description. Rather, it is assumed that the players have equipment for performing simulations of this kind. The events are associated with a point in time and with a geographic position. The time information and geographic position information are, for example, obtained via reception of a GPS-signal 4. However, coordinate systems other than latitude and longitude can be used, and the time and position information can be obtained in a number of other ways. In one example, a plurality of radio transmitters are distributed over the training field, each transmitter having a known position. The transmitters are arranged to transmit a signal identifying the transmitter and preferably including time information. The player equipment is then arranged to upon reception of said transmitter signals acquire the time information and to calculate its own position by use of known triangulation methods. However, satellite based systems, such as GPS, do not provide sufficient signal strength indoors. Thus, the GPS-system, and other systems based on transmittal of high-frequency signals, does not function in enclosed spaces.

Figure 2:
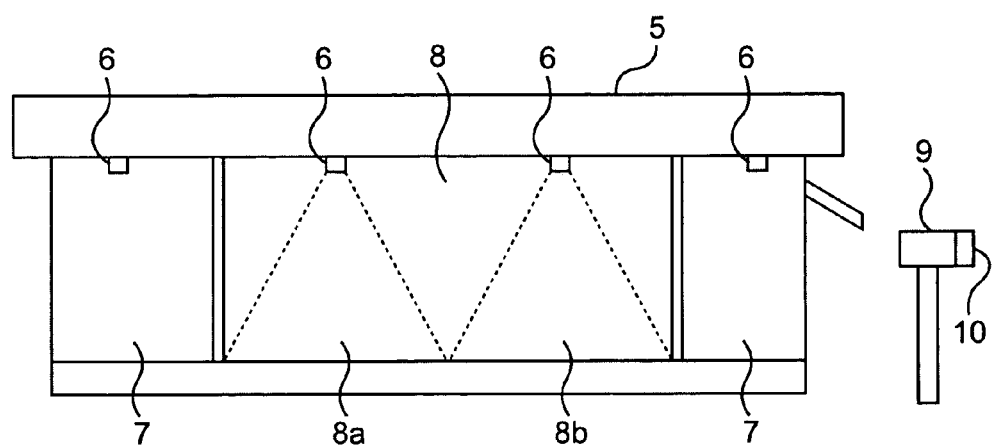
FIG. 2 shows schematically an example of a building in the training field.

In FIG. 2, a building 5 in the training field is provided with transmitters 6, each mounted in the ceiling and each arranged to transmit a code pertaining to a zone of the building. In smaller rooms 7 of building 5, each zone coincides with the corresponding room. Each transmitter 6 is arranged in the room, and can be arranged in the vicinity of an opening to the room. In a case where the room can be entered from several places, a code transmitter may be arranged in the vicinity of each such entrance, such as in the vicinity of each door and window of the room. In a larger room 8, where several zones 8a, 8b are required in order to obtain adequate accuracy in the position determination, the zones are not as sharply marked off as a room. In this case the code transmitters 6 may be arranged to transmit radiation in a distinct lobe, such as a laser lobe, and to sweep over a volume defining the zone.

The code transmitters are, for example, optical transmitters. The transmitters are, in the example shown in FIG. 2, mounted on the ceiling, but they can also be mounted on the walls, in doorcases etc.

A transmitter 9, preferably a radio transmitter, is arranged in the vicinity of the entrance to the building. The transmitter 9 is arranged to transmit data concerning a cross-reference table comprising codes for each zone of the building, wherein each code is associated with a coordinate in the coordinate system used outdoors. The table data transmitted by the transmitter 9 is stored in a memory unit 10 operatively connected to the transmitter 9. The table data is loaded into the memory unit 10 using a technique known in the art. The table data transmitter 9 is mounted in such a position that the probability that players entering the building receive the table data is sufficiently high. If the building has more than one entrance, a table data transmitter 9 can be mounted in the vicinity of each entrance. The table data transmitter can be arranged either outdoors or in the building. Alternatively, the signal strength, and thus reception range, of the table data transmitter is such that one transmitter can be placed anywhere in the building or its close vicinity.

Figure 3:
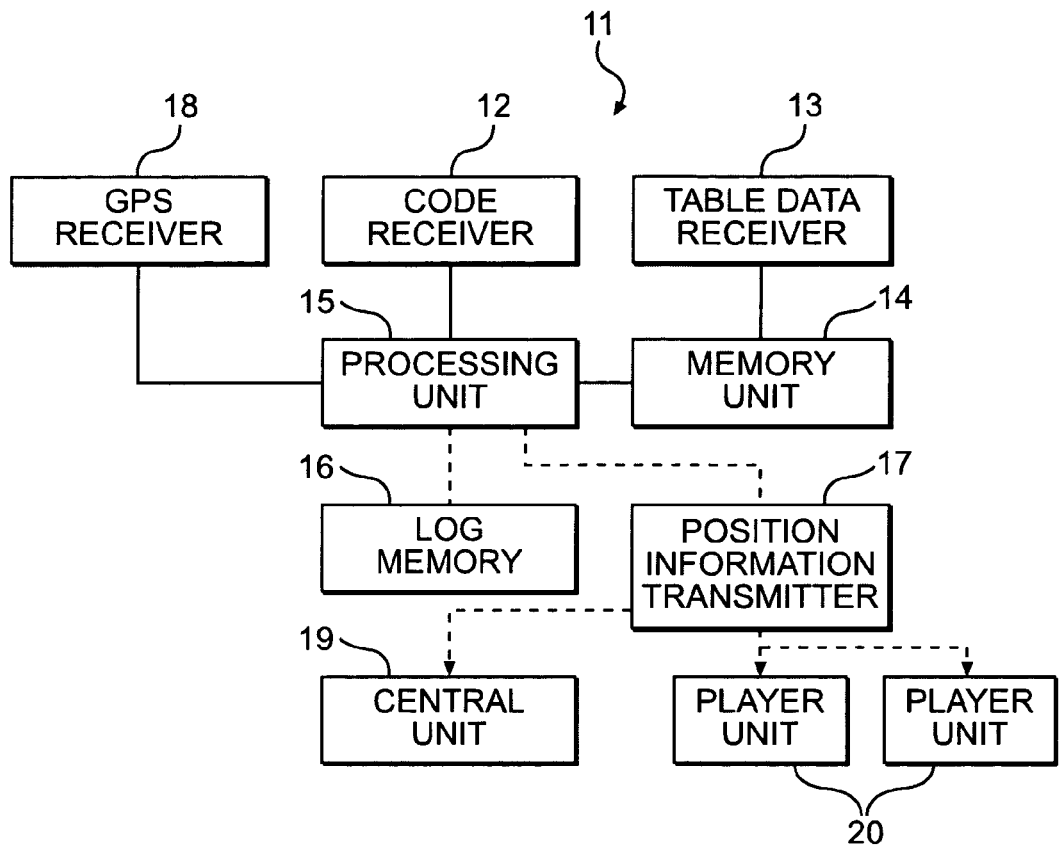
FIG. 3 is a block diagram showing the equipment of players participating in combat training in the training field.

In FIG. 3, equipment 11 worn by the players is shown. Equipment 11 may be worn, for example, in a vest, a harness, or a helmet, and includes a receiver 12 arranged to receive the code from a code transmitter 6, shown in FIG. 1. The player equipment 11 further comprise a receiver 13 arranged to receive the table data from table data transmitter 9, and a memory unit 14, associated with said table data receiver 13 and arranged to store the received table data. The code receiver 12 and the memory unit 14 are connected to a processing unit 15. The received code is fed to the processing unit 15. Upon reception, the processing unit 15 is arranged to compare the received code with the codes in the memory unit 14 and to acquire the coordinates from the memory unit 14 that are associated with the code corresponding to the code from code transmitter 12. The acquired coordinates are, in one example, logged in a log memory 16, preferably implemented in software and connected to the processing unit 15. The movements of the players are then logged in the log memory 16. The data in the log memory 16 can be loaded into a review unit after training, and using this data, the movements of the players during training can be visualized on a map or the like. In another example, the acquired coordinates are used by the processing unit 15 in simulation of events. In a third example, the acquired coordinates are transmitted as position information using a position information transmitter 17. The transmitted position information is then received either by a central unit 19 or by other players 20, or by both. The position information transmitter is, for example, a short range radio transmitter working in the 900 MHz range.

In an extended example, each code transmitter 6 is also connected to a clock function and arranged to transmit time data along with the code. In accordance with this example the position information transmitter 17 is arranged to transmit the time data along with the coordinate data. Alternatively, the clock function is included in the player equipment 11. Either way, the processing unit 15 is arranged to time mark the data sent to the log memory 16, sent to the position information transmitter 17, and/or used for further processing in the processing unit 15.

The equipment 11 further comprises a receiver 18 arranged to receive coordinate data for the player. Typically, the receiver only functions properly outdoors, in non-enclosed spaces. The receiver is, for example, a GPS-receiver, as described above. The coordinate data received by the receiver 18 is fed to the processing unit, which is arranged to feed the coordinate data to the log book or to the position information transmitter 17, and/or to use the coordinate data for event simulation in the same manner as described above. Thus, the equipment 11 provides coordinate data for the player both in enclosed spaces and in non-enclosed spaces. In an extended example, the processing unit is arranged to evaluate the strength of the data received from the GPS-receiver 18 and the data received from the code receiver 12 and based on that evaluation determine from which receiver the processing unit should fetch its data for location determination.

Figure 4:
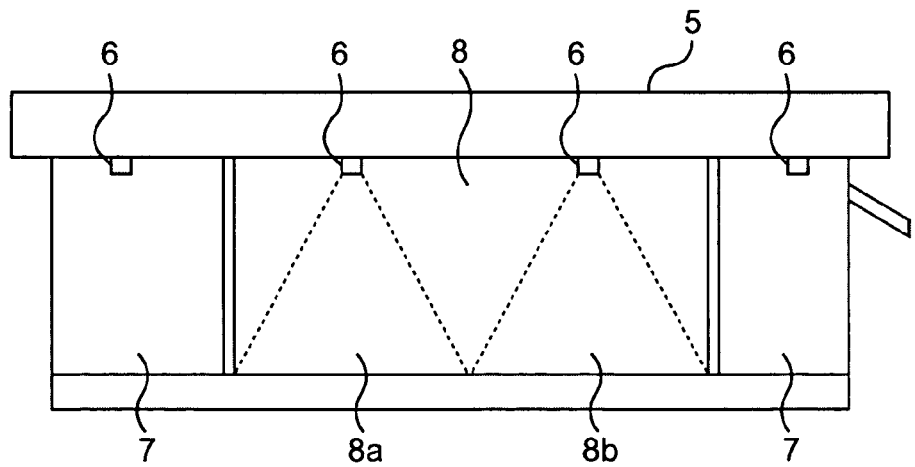
FIG. 4 shows schematically an alternative example of a building in the training field.

In FIG. 4, the building 5 is provided with a plurality of transmitters 6, each arranged to transmit a code pertaining to a zone of the enclosed space, as in the example described in relation to FIG. 2. However, in accordance with this example, the code coincides with a coordinate for the zone given in the coordinate system used outdoors. The table data transmitter(s) 9 is(are) then not required and the processing unit of the player equipment is arranged to receive the coordinates and, without further processing of the coordinates, feed it to the log book, feed it to the position information transmitter 17 and/or use it for event simulation.

In another example, also illustrated by FIG. 4, the building 5 is provided with a plurality of transmitters 6, each arranged to transmit a code pertaining to a zone of the enclosed space, as in the case of FIG. 2. The code for each zone is unique for the whole training field, i.e. no other identified enclosed spaces of the training field have a zone with a code identical to those in the building 5. The player equipment memory unit 14 comprises pre-loaded data comprising codes for the whole training field with associated coordinates. The table data transmitter(s) is(are) not required. The processing unit of the player equipment is then arranged to compare the received code with the codes of the memory unit and to acquire the coordinate from the memory unit associated with the code coinciding with the code from the code transmitter.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for determining a location of a moving object in an enclosed space comprising:
    at least one first optical transmitter adapted to be located in the enclosed space and not adapted to be located on a moving object, wherein each of the first transmitters is operable to transmit a code associated with the first transmitter, wherein the code is representative of a coordinate in a predetermined coordinate system;
    a first receiver adapted to be located on a moving object, the receiver operable to receive the code; and
    a first processing unit adapted to be located on the moving object, the processing unit operable to process codes from the first receiver to determine the location of the moving object based on the code; wherein
    each code denotes a specific zone of the enclosed space;
    each moving object is provided with memory operable to store a cross-reference table including each zone and a coordinate represented by the code in the predetermined coordinate system; and
    the processing unit is further operable to convert each code to the coordinate represented by the code in the predetermined coordinate system using the cross-reference table so as to provide the location of the moving object.

2. The system according to claim 1, further comprising:
    at least one second transmitter operable to transmit cross-reference table data to a moving object entering the enclosed space; and
    a second receiver adapted to be located on the moving object and operatively connected to the memory, the second receiver operable to receive the cross-reference table data from the second transmitter, wherein
    the memory is operable to store the cross-reference table data at least as long as the moving object is within the enclosed space.

3. The system according to claim 1, wherein the predetermined coordinate system is a global positioning system.

4. The system according to claim 1, wherein the processing unit is operable to associate time data to the determined location.

5. The system according to claim 1, wherein each moving object of a first subset of a plurality of moving objects is provided with a third transmitter operable to transmit a determined location of the moving object in the predetermined coordinate system.

6. The system according to claim 1, wherein each moving object of a second subset of the plurality of moving objects is provided with a log memory operable to continuously log determined locations of the moving object.

7. The system of claim 1, wherein the system is included in a combat training system, the moving object comprises a player, and the system is further operable to determine location information for the player when the player is within the enclosed space.

8. The system of claim 7, further comprising:
   a central unit operable to receive the transmitted location information.

9. A method for determining a location of a moving object in an enclosed space, the method comprising the steps of:
   transmitting a code into a zone of the enclosed space, the code being associated with the zone and wherein the code is representative of a coordinate in a predetermined coordinate system;
   receiving at each moving object present within a zone of the enclosed space the associated code; and
   determining at each moving object the location of the moving object using the received code; wherein:
   each code denotes a specific zone of the enclosed space;
   each moving object stores a cross-reference table including each zone and a coordinate represented by the code in the predetermined coordinate system; and
   each code is converted to the coordinate represented by the code in the predetermined coordinate system using the cross-reference table so as to provide the location of the moving object.

10. The method of claim 9, wherein the determining step comprises the step of:
    converting the received code to a coordinate represented by the received code using a cross-reference table, the cross-reference table storing each zone and a coordinate represented by the code in the predetermined coordinate system.

11. The method of claim 10, further comprising the step of:
    transmitting the cross-reference table to a moving object entering the enclosed space; and
    receiving and storing the cross-reference table.

12. The method according to claim 9, wherein the predetermined coordinate system is a global positioning system.

13. The method according to claim 9, further comprising the step of:
    associating time data to the determined location.

14. The method according to claim 9, further comprising the step of:
    transmitting a determined location in the predetermined coordinate system of each of a first subset of a plurality of moving objects.

15. The method according to claim 9, further comprising the step of:
    logging determined locations of each of a second subset of a plurality of moving objects.

16. The method of claim 9, wherein the method is used in a combat training system, the moving object comprises a player, and the method further comprises the steps of:
    receiving at each player present within a zone of the enclosed space the associated code; and
    determining at each player the location of the player using the received code.

17. The method according to claim 16, further comprising the steps of:
    transmitting the determined location information from each player; and
    receiving the transmitted location information at a central unit.

18. The method according to claim 16, further comprising the steps of:
    transmitting the determined location information from each player; and
    receiving at a player transmitted location information from at least one other player.

* * * * *